May 5, 1942.   W. L. BARROW   2,281,551
ELECTRIC COMMUNICATION
Filed Sept. 10, 1937
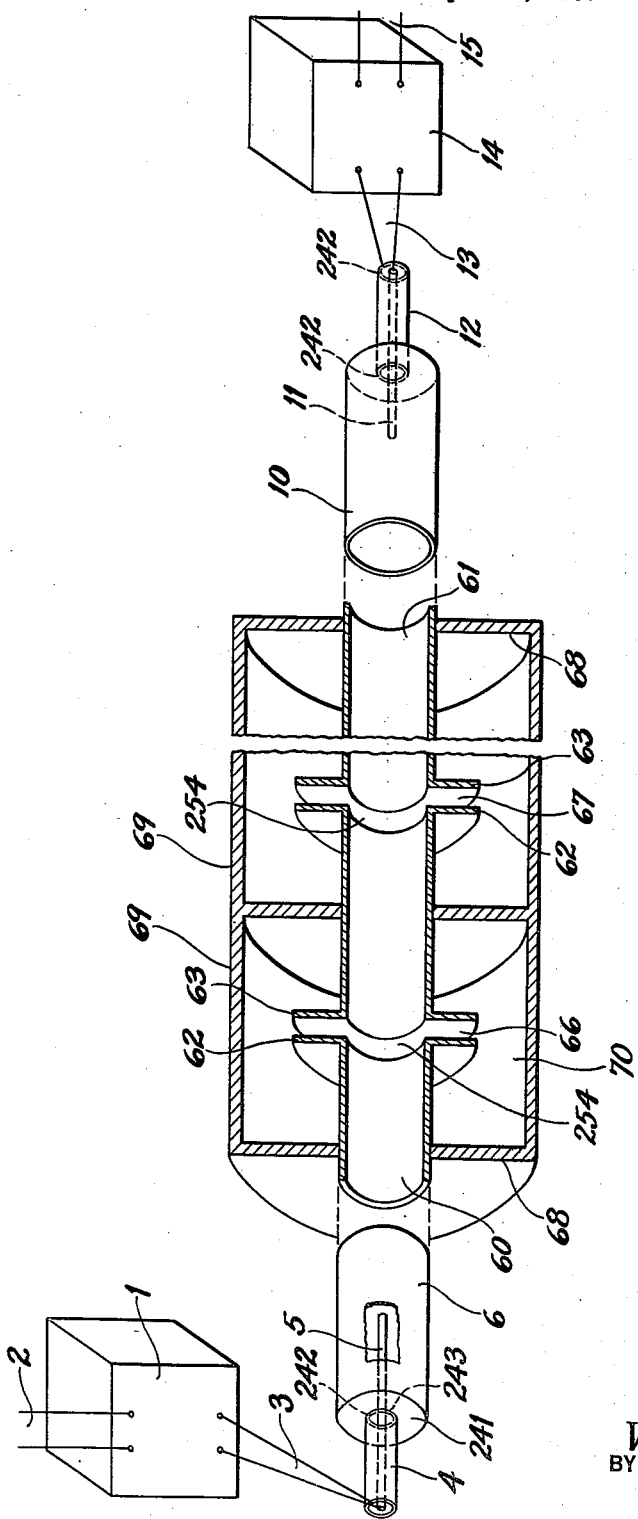
INVENTOR
Wilmer L. Barrows
BY
ATTORNEY Patented May 5, 1942

2,281,551

UNITED STATES PATENT OFFICE 2,281,551

ELECTRIC COMMUNICATION

Wilmer Lanier Barrow, Newton, Mass., assignor to Research Corporation, New York, N. Y., a corporation of New York Application September 10, 1937, Serial No. 163,240

3 Claims. (Cl. 178—44)

The present invention relates to electric communication and, more particularly, to the propagation or transmission of electromagnetic waves at ultra-high frequencies. From a still more specific point of view, the invention has to do with the propagation or transmission of ultra-high-frequency waves through hollow conducting pipes or tubes.

In my article, entitled, "Transmission of Electromagnetic Waves in Hollow Tubes of Metal," Proceedings of the Institute of Radio Engineers, October, 1936, p. 1298, there is disclosed a hollow-pipe system comprising a hollow pipe or tube and a terminal device at each end of the pipe or tube. The hollow pipe or tube may be of metal, or it may be otherwise provided with an inner conducting wall, and it may contain air or other gas, or it may be evacuated. The electromagnetic waves, particularly of ultra-high frequencies, are transmitted through the interior of the pipe or tube. One of the principal uses of the said system is for the transmission of intelligence over long distances. Connection is made to the transmitting or input end of the pipe for delivery of energy to the pipe, and connection is made to the receiving or output end of the pipe for taking off the energy transmitted thereto through the pipe. The pipe constitutes a uni-conductor, and no return conductor is needed. The connections at the transmitting and receiving ends of the pipe may be made through the medium of two-conductor or bi-conductor or parallel-line systems connected to suitable terminal devices that constitute translation apparatus for conducting the energy to and from the hollow pipe. The terminal device at the transmitting end of the pipe, for example, may be connected to a sending or transmitting apparatus through the medium of which energy will be delivered to the transmitting end of the pipe for transmission or propagation through the pipe to the receiving end. The terminal device at the receiving end, on the other hand, will be utilized for the purpose of taking from the pipe the energy that has thus been transmitted through the pipe from the transmitting end. The input leads of the bi-conductor apparatus may be connected to the receiving or input end of the said uni-pipe hollow conductor, and the output leads of the bi-conductor apparatus may be connected to the output leads of the said uni-pipe conductor.

An object of the invention is to provide a novel circuit element for use in a system of the above-described character.

A further object is to provide a novel conducting chamber particularly adapted for use in such system.

A further object of the present invention is to provide a new and improved electric-wave filter for ultra-high frequencies having predetermined characteristics.

Other objects will be described hereinafter and will be more particularly pointed out in the appended claims.

The invention will now be explained in connection with the accompanying drawings, the single figure of which is a diagrammatic perspective of a hollow-pipe transmission system embodying the present invention, showing various features thereof in longitudinal perspective section.

The invention is particularly adapted for use with a hollow-pipe system such as is illustrated in Fig. 1. Modulated high-frequency energy may be brought into a sending-end apparatus 1, at a sending or transmitting station, over a pair of conductors 2. The sending-end apparatus may comprise appropriate ultra-high-frequency generating, controlling and modulating equipment of any well-known character. The modulated ultra-high-frequency energy is taken from the apparatus 1 and delivered, by means of output terminal conductors 3, to the sending end of a hollow conducting pipe or tube 60, 61. The interior of the pipe may be filled with air or any other gas, at suitable pressure; or it may be constituted even of a vacuum, partial or high. One of the conductors 3 of the bi-conductor circuit at the sending-end of the pipe 60 is connected to the sending end of the pipe 60 and the other to a conducting rod 5 that is disposed axially of the pipe 60, 61 at the said sending end. The ultra-high-frequency energy is transmitted through the inside or the interior of the hollow pipe 60, 61, along the direction of its axis, to the receiving end of the pipe 61, where it is delivered to input terminal conductors 13 of a receiving apparatus 14 at a receiving station of any desired construction. One of the conductors 13 of the bi-conductor circuit at the receiving end of the pipe 61 is connected to the receiving end of the pipe 61 and the other to a conducting rod 11 that is disposed axially of the pipe 61 at the said receiving end. At the receiving station, the signal comprising the intelligence, after recovery by demodulation, may be conducted to its intended terminus by conductors 15. Though the energy is delivered to the conducting pipe 60, 61 by the pair of conductors 3, no second conductor is needed within or without the pipe 60, 61 for providing a return connection, as in the conventional two-conductor system. The uni-conductor hollow pipe 60, 61 is thus connected to a bi-conductor sending or receiving system, through the medium of the conductors 3 or 13. The pipe 60, 61 may be constituted of metal, such as copper or aluminum, or it may be constituted of some other material, whether or not metallic, but at least its inner wall or surface should be conducting. It may, however, comprise a metal deposit or the like on the outside surface of a thin-walled dielectric cylindrical pipe or tube. The purpose of the dielectric cylinder is here to support the metal deposit or "inner wall." The pipe may be circular in cross section, or of any other desired cross-sectional shape, such as elliptical, square or rectangular.

The delivery of the energy from the terminal conductors 3 to the pipe 60, 61, and from the pipe 60, 61 to the terminal conductors 13, is illustrated as effected by means of a terminal device. The terminal devices may be electrically connected to the respective ends of the pipe, as illustrated in Fig. 1, p. 1299, of my said paper.

Referring, first, to the left-hand end of Fig. 1, the conducting rod 5 is disposed inside an outer conductor 4 that is integrally joined to a conducting tube 6 of substantially the same diameter as that of the tube 60, 61 and larger than that of the tubular section 4. The outer conductor 4 may be in the form of a section of a tube, or an axially bored rod, substantially coaxial with the pipe 60, 61 and the tube 6. One end of the tube 6 is preferably partly closed by means of a flat metal end plate or disc 241, and its other end is open. One end of the tubular section 4 is mechanically joined smoothly and without break to, so as to be electrically connected with, the metal plate 241 at the closed end of the tube 6. The corresponding inner end of the inner conductor 5 extends axially for a short distance through a centrally disposed opening 243 in the metal plate 241 at the closed end of the tube 4. The elements 4, 5 and related parts may be referred to as a coaxial section or line. The tube 4 communicates with the pipe 60 through this centrally disposed opening in the plate 241. The rod 5 is supported in and spaced from the walls of the tube 4 by insulating members 242. The open end of the tube 6 is connected smoothly, without break, to one end of the hollow pipe 60. The terminal conductors 3 are respectively connected to the other ends of the tubular section 4 and the inner conductor 5. In some cases, the leads to the rod 5 may be brought into the pipe through the tube 4 and the opening 243 in the plate 241.

The closed end of the tube 6 prevents an exchange of energy between the inside and the outside of the hollow tube 60, 61, and serves also to increase the effectiveness of the device, over a band of frequencies, by reflecting radiation that is propagated in the hollow pipe 60, 61 in the direction from the sending end toward the receiving end.

At the receiving station, the energy may be taken by a terminal device similar to the terminal device at the sending end of the pipe 60, 61. The terminal conductors 13 are, respectively, connected to the conducting tube 12 and the conductor 11, respectively similar to the conducting tube 4 and the conductor 5. Except for questions of insulation and of impedance of the said respective bi-conductor circuits, the terminal devices for the sending and for the receiving ends may be identical, because any device that will radiate waves through the hollow tube 60, 61 will be equally effective in picking them up from the hollow tube. The operation is entirely reversible.

As the energy should be delivered by the conductors 3 to the hollow pipe 60, 61 with an efficiency depending upon the results desired, consistent with the very high frequencies employed, the component parts of the terminal device 4, 5, 6 should have such dimensions, and should be so designed, as to obtain a maximum energy transfer, at a particular frequency, from the terminal conductors 3 to the pipe 60, 61, under normal operating conditions; or a uniform energy transfer over a band of frequencies; or to attain some other end. Similar considerations apply to the design of the terminal device 10, 11, 12.

The configuration of the wave that is to be excited determines the design of the terminal. The conducting rods 5 and 11 are shown axially positioned, so as to coincide with a line of electric intensity for the transverse wave. The system will operate even if the conductors 5 and 11 are inserted directly into the hollow pipe 60, 61, and with the conductors 3 and 13 respectively connected directly thereto, and to the hollow pipe.

The shape of the lines of electric and of magnetic force into which may be resolved the electromagnetic wave that is transmitted down through the interior of the pipe 60, 61 and along its inner conducting surface depends upon the material and the shape of the cross section of the pipe, the configuration of the terminal device and the frequency of the transmitted wave.

There is a minimum or critical frequency for each type of wave below which it cannot exist in, and cannot be transmitted through, the hollow pipe. This critical frequency is different for each type of wave and for different pipe materials, shapes and cross-dimensions. As given on page 1323 of my said paper, for a pipe of circular cross section, the minimum frequency $f_0$ below which no transmission can take place by any type of wave is:

$$f_0 = \frac{1.841}{2\pi a \sqrt{\mu_1 \epsilon_1}}$$

Though the pipe is shown straight, it will be understood that this is a diagrammatic showing only, and that the pipe may have any desired shape or configuration over its course from sending station to receiving station. The pipe need not, furthermore, be rigid; it may be flexible, in order that it may be bent to any desired shape.

The invention may provide resonant circuit elements for use with electromagnetic waves of extremely high frequencies, particularly circuit elements adapted for the propagation or transmission of electromagnetic waves through hollow conducting pipes or tubes, though it may be used with circuits of the conventional kind or any other kind. This circuit element may comprise a hollow chamber or cavity that may have sharp resonance characteristics, and it may be used for transmission or reception over hollow-pipe systems of the above-described character, as a resonant shield, and also for other purposes. If the interior of the pipe is constituted of a high vacuum, the pipe may be constructed as an integral prt of a vacuum tube. If not so constructed, the pipe may be associated or combined with vacuum tubes, vacuum systems, or other vacuum devices. The use of the resonant cavity is not restricted to use with pipes that contain air or other gas alone, or that are evacuated, for it is applicable also to pipes and tubes that contain liquid and solid dielectrics. The space chambers or cavities may be of various simple geometrical shapes, such as cylindrical, spheroidal, ellipsoidal, rectangular or parallelopiped.

As one illustration of a resonant element of this character, one or more closed metal compartments, cavities or chambers 70 may be provided between the pipes 60 and 61, bounded by metal discs 68 that are integrally connected to a cylinder 69 that is coaxial with the pipe 60, 61. The dimensions of each cavity, in combination with other factors, ar preferably made such that electrical space resonance occurs within the cavity at the frequency of operation.

At a certain frequency, standing waves will be produced in the hollow cylindrical chamber. These standing waves in the closed resonant cavity will produce therein a condition of space resonance. The closed spaces 70 may thus have sharp resonance characteristics, particularly for use with electromagnetic waves of extremely high frequencies. High-frequency energy may be supplied to, or taken from, such hollow chamber or cavity in the same way as before described.

This sharply resonant hollow-cavity circuit element may be used for many purposes. It may, for example, be embodied as a resonant element in any appropriate ultra-high-frequency generating, stabilizing, choking, amplifying, controlling, modulating or demodulating equipment of any well known character. It may, for example, be embodied in regenerative resonant-cavity vacuum-tube oscillators that may be used as sources of electromagnetic energy of ultra-high frequency.

Each of these closed chambers 70 may be provided with some electrical element, such as a hollow-pipe filter. The filter may be inserted in the hollow-pipe system, and as readily disconnected therefrom, without electrical discontinuity, by means of main-line input and output conducting hollow-pipe sections, shown as the coaxially disposed pipes 60 and 61 and extending into the chamber through intermediately disposed openings in oppositely disposed walls 68 of the chamber. These pipes may be of rectangular or other cross-sectional shape, as well as circular, and each pipe section is connected smoothly to an adjacent pipe section. It is inconsequential, however, which pipe part or parts is used as the input andw hich pipe part or parts as the output.

An intermediate section of the main-pipe extension is removed at 254, to separate the pipes 60 and 61, in order to permit joining two parallel metal discs 62 and 63 to the adjacently disposed open ends of the pipe exposed by the removal of this central portion, at the sides of the space or gap thus formed. The chamber is thus of reduced width at the open ends of the pipes 60 and 61, at the oppositely disposed open ends of the pipes 60 and 61. The spacing of the parallel discs 62 and 63 determines the upper frequency limit above which the filter tends to block transmission. Waves of frequency greater than this value will become attenuated as they try to pass through the pipe 60, 61.

The electrical energy, such as signals and the like, that is transmitted from the hollow-pipe line enters the filter at 60 and leaves at 61. The minimum frequency of a first-order transverse wave that can be so transmitted by a hollow-pipe system without this filter, of circular cross section, is given by the above formula, where $a$ is the radius of the transmission hollow pipe 60, 61. This filter will block the transmission of all frequencies above the said value higher than the critical frequency of the main pipe. If $f_0$ represents the critical frequency for transmission through the pipe 60, 61, as determined by the above formula and the type of wave, this pipe will be blocked for all frequencies below $f_0$. Part of the energy in the waves above the upper frequency limit $f_1$ set by the spacing of the discs 62 and 63 and their radii is led away from the pipe between the discs 62 and 63 and dissipated by radiation out into outside space, thereby reducing or attenuating the energy in the pipe 60, 61, that remains to be sent out through the main-pipe exit 61. The energy in this frequency range between the values $f_0$ and $f_1$ that leaves the filter through the output 61 is thus substantially reduced compared to that entering through the input 60.

Although a band of frequencies between the values $f_0$ and $f_1$ may generally be transmitted, in certain cases the effect of the chamber may occur, to a greater or less degree, at all frequencies above $f_0$, and particularly at the resonant frequencies, as hereinafter explained.

Within the transmission region of the main pipe 60, 61, that includes all values above $f_0$, the filter action of this filter may be considered to be of the low-pass type. As the main pipe 60, 61 itself has high-pass characteristics, however, the over-all performance of the main pipe and its filter element or elements 252 is of the band-pass type.

The metal discs 62 and 63 are shown smaller than the discs 68. In certain instances, the outer radius of the discs 62 and 63 could be varied appropriately to improve the filter action.

One or more pair of parallel discs, like those illustrated at 62 and 63, may be incorporated between the input section and the output section of the hollow pipe. Two such pair are shown at 66 and 67, the discs of each pair being separated by a space 254. Each pair of discs 66, 67, etc., is enclosed in a closed metal compartment 70, between the cylinder 69, each two discs 68, and the pipe 60. The pair of discs 66 is shown in one of these closed spaces 70 and the pair of discs 67 in another. By transmitting some of the energy from the main pipe, and dissipating it into space for all frequencies lying above the critical frequency for the corresponding pair of parallel discs, each successive pair of parallel discs will effect a further attenuation through the main pipe of the transmission of this frequency band. In the ideal case, only the frequency band lying between the critical frequencies for the main pipe and the pairs of parallel discs respectively will be passed by the main pipe.

Energy from the pipe line, as the waves are caused to travel down the pipe 61, passes through the space 254 between the discs of each pair of discs 66, 67 and enter, in part, the corresponding closed space 70. At resonance, this energy will be substantially entirely dissipated within this space 70 and will not, to any appreciable extent, reenter the pipe through the opening 254 between the pairs of discs 66, 67. The provision of the closed space 70 will insure that such energy shall not be radiated into outside space, where it might cause interference, or otherwise disturb the operation of outside electrical systems. This construction provides, furthermore, for perfectly shielding the hollow-pipe system from interference by other electrical systems or disturbances.

It is only at frequencies for which the chamber is resonant, however, and for which a high impedance is afforded across the gap between the discs, that the energy will become dissipated in the closed chamber 70. At these resonant frequencies, it is possible to extract a major part of the energy from the wave in the pipe 61, and to deliver it to the resonant chamber. This energy may be dissipated as heat, or it may be conducted away from the chamber through appropriate biconductor or hollow-pipe coupling means. At other than the resonant frequencies, the system may be operated so that only a small part of the energy is so dissipated, the remainder of the energy being returned to the pipe.

This will be understood from the following considerations. A voltage is first built up across the gap or opening 254 between the discs or annuli 62, 63 the radii of which, as before stated, may have any desired value, even zero. This voltage is applied to the closed-cavity impedance element comprising the inner surfaces of the shell 70 and space enclosed therein. Over certain ranges of frequency, obviously, this element may act as an equivalent capacitance, over others as an equivalent inductance, and at certain discrete frequencies, at which resonance occurs, substantially as a resistance, the reactive effects substantially all vanishing. The magnitude of this resistive effect, at resonance, depends upon the materials of which the structure is constituted, its shape and the absolute frequency. A large number of discrete resonant frequencies will, in general, obtain corresponding to different modes of oscillations of the cavity 70. Some of these modes of vibration are preferable to others as regards certain applications and as to losses.

Modifications may be made by persons skilled in the art without departing from the spirit and scope of the invention, as defined in the appended claims.

What is claimed is:

1. An electric system comprising two conducting pipes substantially coaxially disposed and separated from each other, the adjacently disposed ends of the pipes being open and each being provided with an annulus, and a resonant conducting chamber into which the said ends of the pipes project a substantial distance in order that the annuli may be wholly enclosed in the conducting chamber, the annuli being wholly spaced from the walls of the conducting chamber.

2. A filter for electromagnetic waves comprising two conducting pipes substantially coaxially disposed and separated from each other, the transverse dimensions of the pipes each corresponding substantially to a critical wave frequency, whereby the pipes will respectively transmit therethrough electromagnetic waves of frequencies greater than the said respective critical frequencies, and the adjacently disposed ends of the pipes being open and each being provided with an annulus joined along its inner circumference to the open end of the corresponding pipe, the space between the annuli at their outer circumferences being open.

3. A filter for electromagnetic waves comprising two conducting pipes substantially coaxially disposed and separated from each other, the transverse dimensions of the pipes each corresponding substantially to a critical wave frequency, the adjacently disposed ends of the pipes being open and each being provided with an annulus joined along its inner circumference to the open end of the corresponding pipe, and a conducting chamber into which the said ends of the pipes project a substantial distance in order that the annuli may be wholly enclosed in the conducting chamber, the annuli being wholly spaced from the walls of the conducting chamber, whereby electromagnetic waves of frequencies greater than one of the said critical frequencies will be transmitted through one pipe and into the chamber and out of the chamber through the other pipe.

WILMER LANIER BARROW.